March 19, 1940.  W. RIEGER ET AL  2,194,151
APPARATUS FOR SEPARATING WATER AND SALT FROM STEAM
Filed Nov. 10, 1937
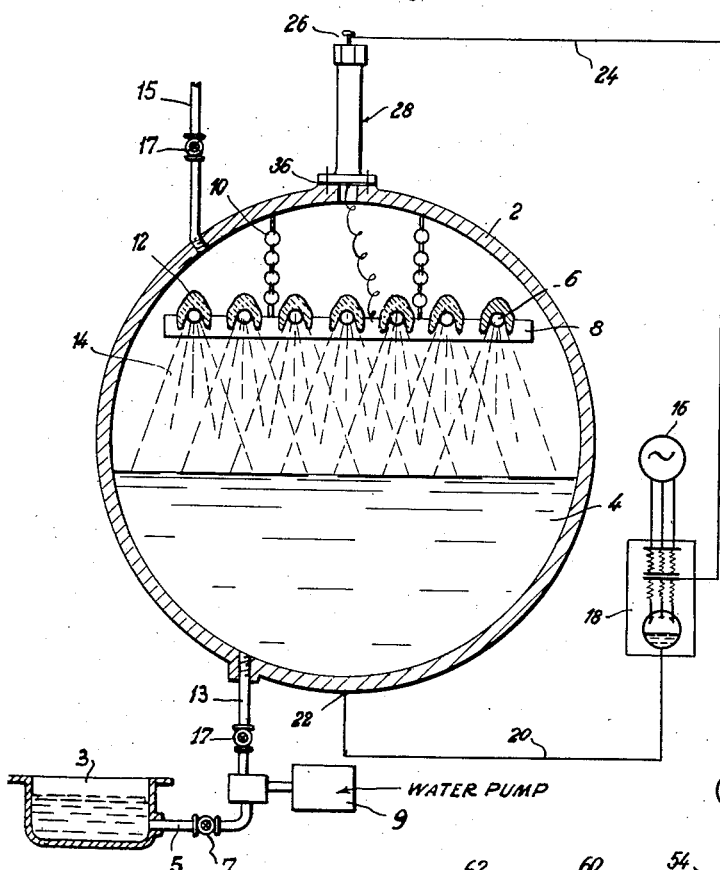
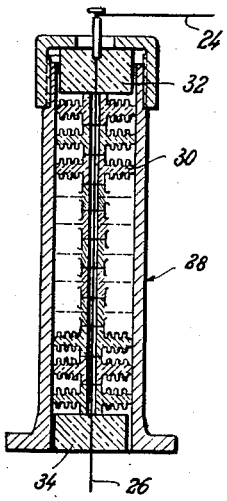
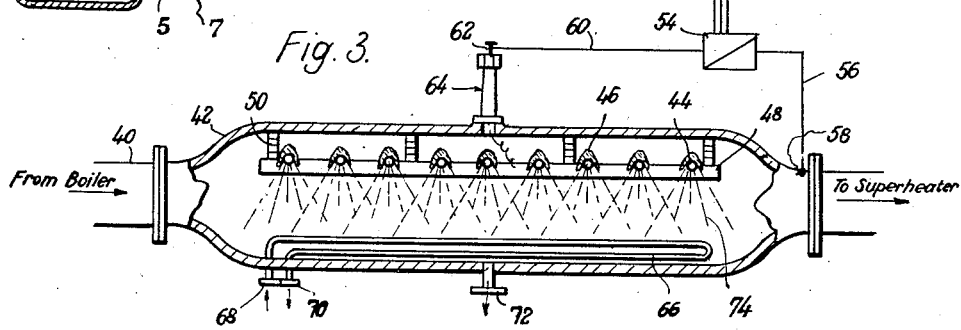
Inventors:
Wilhelm Rieger,
Otto H. Hartmann,
Bailey & Carson
Attorneys Patented Mar. 19, 1940

2,194,151

UNITED STATES PATENT OFFICE 2,194,151

APPARATUS FOR SEPARATING WATER AND SALT FROM STEAM

Wilhelm Rieger and Otto H. Hartmann, Kassel-Wilhelmshohe, Germany

Application November 10, 1937, Serial No. 173,950
In Germany November 19, 1936

12 Claims. (Cl. 122—491)

This invention relates to the separation of foreign particles of matter such as water and salt from steam. More specifically the invention is directed to making the separation through electrical means.

Although it has been common to purify the feed water supplied to a boiler and to use water separators to separate water from steam, it has been discovered that salt and water are present in the generated steam that is supplied to the steam engine. It has been further discovered that the percentage of salt content, even under the most favorable operating conditions, amounts to from 2 to 5 mgr. per cubic dcm. of steam, and it has heretofore been considered impossible to reduce the salt content below this value.

It was formerly considered that the water and salt were carried along with the steam by reason of the disintegration of the water surface during boiling and the carrying along with the escaping steam of particles of water and salt separated from the water surface. It was further believed that the boiling created a reduction of the evaporation point of the salts, and by reason thereof a quantity of salt was carried into the generated steam. This was supposed to have been especially true of water having a high sodium hydroxide content.

The existence of the salts in the steam causes a salt precipitation in steam engines, and consequently a destruction of the efficiency of the engines. Attempts have been made to clean the salt and the water from the steam, as by washing the steam in a special apparatus. However, known methods have never been very successful.

The instant invention relies upon a new discovery relating to the character of the particles taken along with the steam. It has been found that the particles of salt and water are electrically charged, and are insulated by the steam when being carried thereby.

It is therefore an object of this invention to remove particles of salt and water from steam by electrical means.

Another object of this invention is to remove particles of salt and water from steam by subjecting the particles of salt and water to the action of an electron emitting body, and precipitating the particles contacted by the electrons.

A further object of this invention is to remove the particles of salt and water from steam by means of an apparatus which is compact, and easily installed in either the boiler itself or in a steam line.

It is also an object of this invention to provide a novel means of connecting an electrical circuit to the electron emitting body.

These objects are obtained by exposing the steam and the particles therein to the action of an electron emitting body. The electrons emitted by the body charge the salt and water particles and cause the particles to be precipitated out of the steam. The electron emitting body can be arranged within the boiler itself, in which the water surface is used for precipitating the particles thereon, or the electron emitting body can be positioned in a steam line with cooling coils arranged to provide a cooling medium for the precipitation of the particles.

A means by which the objects of this invention may be obtained is illustrated by the following construction, reference being made to the accompanying drawing in which:

Fig. 1 is a cross-sectional view of a boiler embodying one form of the invention.

Fig. 2 is an enlarged cross-sectional view showing the construction of the electrical lead to the electron emitting body, and Fig. 3 is a partial cross-sectional view of a steam line showing the electron emitting body placed therein.

In Fig. 1 the wall of a boiler is shown at 2, said boiler being partially filled with water 4 and being heated in any customary manner. As is conventional, the boiler is provided with a feed water supply means comprising a water reservoir 3, connected through pipe 5 and valve 7 to pump 9, and thence through valve 11 and pipe 13 into the boiler; and a steam take-off comprising pipe 15 and check valve 17. Above the surface of the water are arranged a plurality of conductors 6 which may be, as shown, formed as a grid having parallel bars secured at their ends by cross bars 8 which function as bus bars. The grid is suspended from the wall of the boiler 2 by insulated hangers 10. Over the conductors 6 are reflectors 12 which may be made of any suitable material, such as metal, glass, or porcelain, and which may have parabolic reflecting surfaces to direct radiation from the conductors 6 toward the surface of the water, as shown by the dotted lines 14.

The conductors are energized from any electrical source, such as a source of alternating current 16, which is passed through a rectifier 18. An electrical circuit is established from the rectifier by means of a lead 20 attached to the metal wall of a boiler at 22, and by means of a wire 24 connected to the lead 26, which latter lead extends to the conductors 6.

Lead 26 is carried into the boiler and insulated from the wall 2 of the boiler by being passed through a metal jacket 28 in which are located a plurality of insulators 30. These insulators are spaced from the ends of the chamber by insulating blocks 32 and 34, and the chamber 28 is sealed to the top of the boiler by any suitable means, as shown at 36. By this construction a good heat insulation is obtained with respect to the boiler, and therefore the lead 26 enters the boiler through a structure which provides insulation against high temperatures as well as against the high pressures generated in the boiler.

It is thus seen that when a high potential is applied to the leads 20 and 24, the conductors 6 will become heated and will accordingly emit electrons. The passage of the electrons from the conductors 6 to the walls 2, either directly, or through the water 4, forms a path for the completion of the electrical circuit. It is noted that the reflectors 12 direct the electrons emitted from the conductors 6 primarily towards the water surface. Therefore, as steam is generated, the particles of water and salt which are being formed in the steam are struck by the electrons emitted from the conductors 6, and are electrically charged thereby. The charged particles are thrown against the walls or water surfaces and are precipitated. The structure shown in Fig. 1 has the particular advantage that as the particles are separated from the evaporating surface, they are immediately forced back into the surface, and thus the steam that is removed from the boiler is effectively cleaned.

It is, of course, understood that although the means shown consists of charging the particles of salt and water by means of electrons emitted from a body, it is also possible to employ any other means which would put a charge upon the particles so that they would be precipitated.

Fig. 3 shows another embodiment of the invention in which the electron emitting body is placed within a steam line. Steam is taken from a boiler through a steam line 40 and passed through an enlarged chamber 42. Mounted within the chamber 42 are a plurality of conductors 44 which may be in the form of a grid as shown in Fig. 1, and which are covered by reflectors 46 and have a common bus bar 48. The conductors are suspended from the wall of the chamber 42 by means of insulators 50. Current is shown supplied from a source of alternating current 52 through a rectifier 54, the direct current being supplied by a lead 56 attached to the chamber 42 at 58 on one side, and by a lead 62 attached to the bus bar 48 through an insulating chamber 64 similar in construction to the chamber 28 shown in Fig. 1. The cooling medium is carried to the chamber through a tubular coil 66 which is supplied through inlets 68 and outlets 70. Drain 72 is inserted adjacent the cooling coil for the flushing of the chamber of deposited materials. The system works as shown in Fig. 1. Thus current supplied from the rectifier causes the conductors 44 to emit streams of electrons indicated by the dotted lines 74, which streams of electrons impinge upon all the particles passing with the steam through the chamber. The particles, because of the reflectors 46, are impinged against the cooling coils 66 which are maintained at a temperature slightly below the saturation temperature of the steam. The purified steam passes to the superheater or to the point of use in a clean condition. The cooling coils 66 may be made as a replaceable unit.

This means of clarifying the steam of foreign particles, such as salt and water, is particularly effective in boilers operating at high pressures. The apparatus is easily and cheaply installed and very economically operated and maintained. The reduction of the salt and water content in the steam that is to be used in an engine is effective and accomplished by means of a structure which adds little cost or weight to the conventional type of boiler, and thus provides a very advantageous structure over the devices heretofore known to the art.

Having now described structures which embody the principles of our invention, what we claim is:

1. In a steam generating boiler and apparatus for the removal of foreign particles from freshly generated steam comprising glow discharge means for charging electrically foreign particles in said steam, and surface means for precipitating said charged particles from said steam.

2. An apparatus as in claim 1, said surface means to precipitate said particles comprising water surfaces in said boiler.

3. An apparatus as in claim 1, said glow discharge means to charge electrically said foreign particles comprising a series of electrical conductors, and means to energize said conductors into electron emitting bodies.

4. An apparatus for the removal of foreign particles from steam comprising a boiler having a steam and water chamber, an electrical conductor within said chamber, means to energize said conductor into an electron emitting body, and reflector means mounted upon said conductor to direct electrons emitted from said body only upon the surface of said water.

5. A boiler containing water having a steam generating surface, a plurality of electrical conductors arranged above said surface, and means energizing said conductors into electron emitting bodies for electrically charging foreign particles in generated steam and precipitating said particles upon said surface.

6. A boiler as in claim 5, said energizing means including a lead for said conductors extending through a wall of said boiler, and insulating means for mounting said lead outwardly of said wall composed of a series of spaced insulators contained within a closed vessel.

7. A device for the removal of foreign particles from steam comprising a boiler having a steam and water chamber and having an electrical conducting wall, a conductor in said chamber, electrical supply means, means for electrically connecting said supply means to said conductor, means electrically connecting said supply means to said wall and means for directing electrons emitted from said conductor through steam in said chamber toward said wall.

8. A device for the removal of foreign particles from steam comprising a boiler having a steam and water chamber and having an electrical conducting wall, a conductor comprising an electron emitting body in said chamber, electrical supply means, means for electrically connecting said supply means to said conductor, means for electrically connecting said supply means to said wall, and reflector means mounted on said conductor for directing electrons emitted by said conductor only against water in said chamber.

9. In a steam boiler an apparatus for the removal of foreign particles from freshly generated steam comprising a steam chamber for receiving freshly generated steam, glow discharge means mounted in said chamber for charging electrically foreign particles in said steam, and a cooling element within said chamber against which said particles are adapted to be precipitated.

10. In a steam boiler as in claim 9, said cooling element comprising a member having one face disposed toward said glow discharge means, and means for cooling an opposite face of said member with a cooling medium.

11. In a steam boiler as in claim 9, said cooling element comprising a cooling coil adapted to have a cooling medium circulated therethrough.

12. A device for the extraction of foreign particles from steam freshly generated in a high pressure boiler comprising a steam chamber connected in a steam line and adapted to receive freshly generated steam from said boiler, an electron emitting body located within and to one side of said chamber, and a cooling element within said chamber and oppositely disposed to said body.

WILHELM RIEGER.
OTTO H. HARTMANN.